3,663,697
3 - METHYLQUINOXALINE - 2 - CARBOXAMIDE-1,4-DIOXIDES FOR THE CONTROL OF *SALMONELLA CHOLERAESUIS* INFECTIONS
Lloyd H. Conover, Quaker Hill, Conn., assignor to Pfizer Inc., New York, N.Y.
No Drawing. Filed Oct. 7, 1970, Ser. No. 78,920
Int. Cl. A61k 27/00
U.S. Cl. 424—250               6 Claims

ABSTRACT OF THE DISCLOSURE

A method for the control of Salmonella infections in domestic animals, particularly *Salmonella choleraesuis* infections in swine, by administering to the animals an effective amount of a 3-methylquinoxaline-2-carboxamide-1,4-dioxide of the formula:

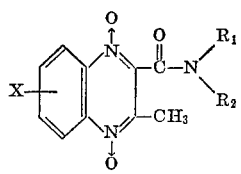

wherein

X is a 6- or a 7-position substituent selected from hydrogen, chloro, bromo, fluoro, methyl, methoxy and trifluoromethyl;

$R_1$ is hydrogen or alkyl having from one to four carbon atoms;

$R_2$ is hydrogen, methyl or ethyl, with the proviso that the total number of carbon atoms in $R_1$ and $R_2$ is not greater than four.

BACKGROUND OF THE INVENTION

The antibacterial activity of quinoxaline-1,4-dioxides has been reported in several publications. Activity against gram-positive bacteria is described by McIlwain (J. Chem. Soc., 322–5, 1943), Wiedling (Acta Pathol., et Microbiol. Scand. 22, 379–91, 1945), Francis (Biochem. J. 63, 455–7, 1956) and in numerous patents (Belgian 721,724; 721,725; 721,726; 721,727; 727,728 and U.S. 2,891,062).

Additionally, the gram-negative antibacterial activity of several quinoxaline-di-N-oxides bearing 2-alkyl or 2,3-dialkyl groups has been described by Landquist et al., U.S. Pat. 2,626,259, issued Jan. 20, 1953, and by Wielding, Acta Pathol., et. Microbiol. Scand. 22, 379–91 (1945).

Francis et al. (Biochem. J. 63, 455–7 (1956)) reported that several 1,4-quinoxaline-di-N-oxides show activity either in vitro or in infections in mice. They observed that 2,3-dimethyl-quinoxaline-di-N-oxide was highly effective in mice versus *Salmonella dublin* and *Salmonella typhimurium* but had little activity in vitro. Subsequent investigation showed 2 - hydroxymethyl-3-methyl-quinoxaline-di-N-oxide, a metabolite of 2,3-dimethyl-quinoxaline-di-N-oxide, to be the active agent.

Coulthard and Hale (Brit. J. Pharmacol. 10, 394–6, 1955) published on the in vivo activity of quinoxaline-1,4-dioxide against various gram-negative bacteria including *Salmonella typhimurium* and *Salmonella para-typhimurium* B.

*Salmonella choleraesuis* is a common source of infections in swine and is often observed in other animal species. It is also an important human pathogen because of the severity of its effects rather than because of the number of infections attributed to it. Swine are apparently common carriers of *S. choleraesuis* and often develop salmonellosis under stress. They can, of course, and often times do, remain asymptomatic carriers throughout their life.

No drugs or antibiotics have proved to be entirely effective in eliminating *S. choleraesuis*. Many of the available ones successfully ameliorate the infection but do not remove the animal from the role of a carrier and potential source of further infection.

The prior art quinoxaline-1,4-dioxides, with the possible exception of 2-hydroxymethyl-3-methylquinoxaline-1,4-dioxide, are of no real value for the control of Salmonella infections in general. None of them are particularly effective against *S. choleraesuis*.

SUMMARY OF THE INVENTION

It has now been found that certain 3-methylquinoxaline-2-carboxamide-1,4-dioxides of the formula:

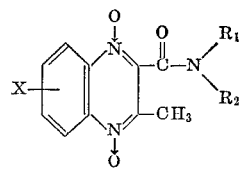

wherein

X is a 6- or 7-position substituent selected from the group consisting of hydrogen, chloro, bromo, fluoro, methyl, methoxy and trifluoromethyl;

$R_1$ is selected from the group consisting of hydrogen and alkyl having from one to four carbon atoms; and $R_2$ is selected from the group consisting of hydrogen, methyl and ethyl;

with the proviso that the total number of carbon atoms in $R_1$ and $R_2$ is not greater than four are especially valuable as agents for the control of Salmonella infections in domestic animals, and particularly for the control of *Salmonella choleraesuis* infections in swine, by the oral and parenteral routes of administration. Homologous compounds wherein the total number of carbon atoms in $R_1$ and $R_2$ is greater than four are of little or no value for the control of *S. choleraesuis*. The compounds of this invention are conveniently administered to the animals via their feed or drink. In the case of large animals, e.g., cattle, parenteral administration or oral administration as a drench or bolus is often convenient.

The 3-methylquinoxaline-2-carboxamide-1,4-dioxides of this invention are known compounds, the preparation and properties of which are disclosed in Belgian Pats. 697,-976 and 721,724, respectively. Those that are not specifically described in the art are, of course, homologs of the known compounds and are prepared by the same methods. The compounds are readily made by reaction of the appropriate benzofuroxan with diketene and the appropriate amine, $R_1R_2NH$, in a reaction-inert solvent and in the presence of a base catalyst; or by reaction of the appropriate benzofuroxan and pre-formed β-acetoacetamide compounds under similar conditions.

As already mentioned, these valuable compounds are effective for the control, that is, the treatment and prevention, e.g., prophylaxis, of the herein described infections. For such purposes many modes of administration of the novel compounds of this invention are possible including the oral and parenteral routes of administration, the method of choice being dictated by the type and severity of the infection and in part by the size of the animal. For large animals, as cattle, parenteral dosage is sometimes preferred since it permits positive control over the dosage administered. These compounds may be administered alone or, preferably, in combination with a pharmaceutical carrier and, as such, can be given in single or multiple doses. More particularly, they may be administered in suitable dosage forms to provide a dosage unit of active ingredient in an amount that is adjusted to the particular needs of the individual. When large doses of these compounds are to be used, it is preferable to administer two or more doses at various time intervals.

When used for such purposes, these novel compounds can be administered orally or parenterally, e.g., by subcutaneous or intramuscular injection, at a dosage of from about 1 mg./kg. to about 100 mg./kg. of body weight. For parenteral administration, dosages of from about 2.5 mg./kg. to about 50 mg./kg. of body weight are preferred. Vehicles suitable for parenteral injection may be either aqueous such as water, isotonic saline, isotonic dextrose, Ringer's solution, or non-aqueous such as fatty oils of vegetable origin (cotton seed, peanut oil, corn, seseme), dimethylsulfoxide and other non-aqueous vehicles which will not interfere with the efficiency of the preparation and are non-toxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, hyaluronidase, local anesthetics and inorganic salts to afford desirable pharmacological properties. For oral administration, dosages of from about 2.5 mg./kg. to about 50 mg./kg. of body weight are favored. This can be achieved by a number of methods including dosage unit formulations such as capsules, boluses, mixtures, e.g., drenches, and solutions. Other methods include mixing with the feed, the preparation of feed concentrates and supplements. Additionally, dilute solutions or suspensions, e.g., a 0.1 percent solution, can be supplied for drinking purposes.

Further, these compounds may be combined with feeds or with various non-toxic inert carriers in the form of capsules, boluses, dry mixes, suspensions, solutions, elixirs and parenteral solutions or suspensions. The carriers employed include solid diluents, aqueous vehicles, non-toxic organic solvents and the like. In general, the compounds of this invention are present in various dosage forms at concentration levels ranging from about 0.001 percent to about 0.015 percent by weight of the total omposition.

For purposes of oral administration, tablets containing various excipients such as citric acid, sucrose, starch and lactose may be employed along with various disintegrants such as alginic acid and certain complex silicates together with binding agents such as polyvinylpyrrolidone, gelatin and acacia. In addition, lubricating agents such as magnesium stearate, sodium metaphosphate and talc are often very useful for tabletting purposes. Solid compositions of a similar type may also be employed as fillers in soft elastic and hard shelled gelatin capsules. Preferred materials in this connection would also include polyethylene glycol and glycerin as they not only may be used in this particular type of pharmaceutical dosage form as diluents but also as plasticizing agents serving to protect the capsule against any leakage that might possibly occur due to denaturing of the gelatin protein. When aqueous suspensions and elixirs are desired for oral admniistration, the compounds of this invention may be combined with various emulsifying and suspending agents together with such diluents as water, ethyl alcohol, propylene glycol, glycerin and various combinations thereof.

Solutions or suspensions of these valuable compounds in pyrogen-free sterile distilled water containing a preservative such as butylparaben, chlorobutanol, phenol and the like, may be utilized for parentral administration by the subcutaneous, intramuscular or intravenous route of injection.

The addition of a low level of one or more of the herein described compounds to the diet of animals, both ruminant and non-ruminant (poultry, cattle, sheep, dogs, cats, swine, horses, goats, mules, foxes, rodents, mink, rabbits), such that these animals receive the product over an extended period of time, at a level of from about 1 mg./kg. to about 100 mg./kg. of body weight per day, provides an especially convenient method of prophylaxis.

Any animal feed composition may be prepared to comprise the usual nutritional balance of energy, proteins, minerals, and vitamins together with one or more of the 3 - methylquinoxaline - 2 - carboxamide - 1,4 - dioxides described above. Some of the various components are commonly grains such as ground grain, and grain by-products; animal protein substances, such as meat, and fish by products; vitaminaceous mixtures, e.g., vitamin A and D mixtures, riboflavin supplements and other vitamin B complexes; and bone meal, limestone, and other inorganic compounds to provide minerals.

The relative proportions of the 3-methylquinoxaline-2-carboxamide-1,4-dioxides in feeds and feed concentrates may vary somewhat, depending upon the compound, the feed with which they are employed and the animal consuming the same. These substances are advantageously combined in such relative proportions with edible carriers to provide concentrates which may readily be blended with standard nutritionally balanced feeds or which may be used themselves as an adjunct to the normal feedings.

Dry pre-mixes containing these compounds are prepared containing from 0.10 to about 10 percent of the active ingredient mixed with salt (sodium chloride) and other minerals which it is desired to incorporate into the poultry ration. This can then be fed on an ad libitum basis by adjusting the proportion of active ingredient in the mixture to the average daily consumption per bird so as to provide the proper daily dose as specified above. If prepared feed supplements are employed, the material can be administered in admixture with the feed. Again a concentration range of about 0.001 to 0.015 percent of the drug in the feed is employed. However, higher proportions can be satisfactorily employed depending upon the palatability of the product to the animal. This can be readily determined by simple experimentation. It is sometimes convenient to mix the daily dose with only a portion of the average daily allotment to insure complete consumption of the dose. The balance of the daily feed supplement can then be fed after consumption of the medicated portion in the usual fashion. These methods are particularly useful for prophylactic treatment, but similar compositions can be employed for therapeutic use.

In the preparation of concentrates a wide variety of carriers may be employed containing the aforesaid drugs. Suitable carriers include the following: soybean oil meal, corn gluten meal, cotton seed oil meal, sunflower seed meal, linseed oil meal, cornmeal, limestone and corncob meal. The carrier facilitates uniform distribution of the active material in the finished feed with which the concentrate is blended. This is, especially important because only a small proportion of these potent materials are required. The concentrate may be surface coated, if desired, with various proteinaceous materials or edible waxes, such as zein, gelatin, microcrystalline wax and the like to provide a protective film which seals in the active ingredients. It will be appreciated that the proportions of the drug preparation in such concentrates are capable of wide variation since the amount of active materials in the finished feed may be adjusted by blending the appropriate proportion of concentrate with the feed to obtain the desired degree of supplementation. In the preparation of high potency concentrates, i.e., premixes, suitable for blending by feed manufacturers to produce finished feeds or concentrates of lower potency, the drug content may range from about 0.1 g. to 50 g. per pound of concentrate. A particularly useful concentrate is provided by blending 2 g. of drug with one pound of limestone or one pound of limestone-soybean oil meal (1:1). Other dietary supplements, such as vitamins, minerals, etc., may be added to the concentrates in the appropriate circumstances.

The high potency concentrates may be blended by the feed manufacture with proteinaceous carriers, such as soybean oil meal, to produce concentrated supplements which are suitable for direct feeding to animals. In such instances the animals are permitted to consume the usual diet of corn, barley and other fibrous grains and the like. The proportion of the drug in these supplements may vary from about 0.1 to 10 g. per pound of supplement.

The concentrates described may also be added to animal feeds to produce a nutritionally balanced, finished feed containing from about 10 to about 150 g. of the quinoxaline-1,4-dioxide per tone of finished feed. In the case of ruminants, the finished feed should contain protein, fat, fiber, carbohydrate, vitamins and minerals, each in an amount sufficient to meet the nutritional requirements of the animal for which the feed is intended. Most of these substances are present in naturally occurring feed materials such as alfalfa hay or meal, cracked corn, whole oats, soybean oil meal, corn silage, ground corn cobs, wheat bran and dried molasses. Bone meal, limestone, iodized salt, and trace minerals are frequently added to supply the necessary minerals, and urea to provide additional nitrogen.

As is well-known to those skilled in the art, the types of diets are extremely variable depending upon the purpose, type of feeding operation, species, etc. Specific diets for various purposes are listed by Morrison in the Appendix of "Feeds and Feeding," the Morrison Publishing Company, Clinton, Iowa, 1959.

In the case of non-ruminant animals, such as hogs, a suitable feed may contain from about 50 to 80 percent of grains, 3 to 10 percent animal protein, 5 to 30 percent vegetable protein, 2 to 4 percent of minerals, together with supplementary vitaminaceous sources.

In all these various formulations the active agents can be one or a plurality of the compounds of this invention. These compounds may also be advantageously employed in combination with other pharmaceutically-acceptable compounds such as the tetracycline-type antibiotics, carbomycin, neomycin, bactracin, tylosin, sulfomethazine and penicillin-type antibiotics.

The $PD_{50}$ values (the dosage which will bring about 50 percent survival of the test animals) of representative compounds within the scope of this invention against *S. choleraesuis* in mice are presented below (Table I):

TABLE I

[$PD_{50}$ (mg./kg.) values of 3-methylquinoxaline-2-carboxamide-1,4-dioxides vs. *S. choleraesuis*]

| X | $R_1$ | $R_2$ | $PD_{50}$ | X | $R_1$ | $R_2$ | $PD_{50}$ |
|---|---|---|---|---|---|---|---|
| H | H | H | 4 | Cl | H | $C_2H_5$ | 25 |
| H | H | $C_2H_5$ | 7 | Cl | n-$C_3H_7$ | H | >25 |
| H | n-$C_3H_7$ | H | 12 | Cl | i-$C_3H_7$ | H | 19 |
| H | $CH_3$ | $CH_3$ | 6.25 | Br | H | $C_2H_5$ | 13 |
| H | $C_2H_5$ | $C_2H_5$ | 8.5 | Br | H | $C_2H_5$ | 23 |
| $CH_3O$ | H | $CH_3$ | 31 | F | H | H | 2.5 |
| $CH_3O$ | H | $C_2H_5$ | 47 | F | H | $CH_3$ | 5 |
| Cl | H | H | 6.25 | F | H | $C_2H_5$ | 8.5 |
| Cl | H | $CH_3$ | 12 | | | | |

The following examples are given to illustrate this invention.

Example I

A pig weighing 66 pounds, diagnosed as being infected with *S. choleraesuis* by isolation and identification of the organism, is fed a daily ration containing 1.5 gms. of 3-methylquinoxaline - 2 - carboxamide-1,4-dioxide for one week. The animal is sacrificed and, upon examination, found to be essentially free of *S. choleraesuis*.

The compounds of Table I and the following compounds produce similar results:

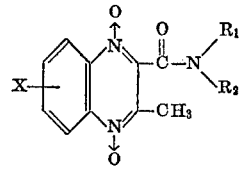

| X | $R_1$ | $R_2$ | X | $R_1$ | $R_2$ |
|---|---|---|---|---|---|
| H | $CH_3$ | $CH_3$ | H | n-$C_4H_9$ | $CH_3$ |
| Cl | $CH_3$ | $CH_3$ | F | n-$C_4H_9$ | $CH_3$ |
| F | $CH_3$ | $CH_3$ | $CH_3$ | n-$C_4H_9$ | $CH_3$ |
| $CH_3$ | $CH_3$ | $CH_3$ | $CF_3$ | H | H |
| H | $C_2H_5$ | $C_2H_5$ | H | n-$C_3H_7$ | $CH_3$ |
| F | $C_2H_5$ | $C_2H_5$ | $CF_3$ | H | $CH_3$ |
| $OCH_3$ | $C_2H_5$ | $C_2H_5$ | $CF_3$ | $C_2H_5$ | $C_2H_5$ |

Example II

Thirty pigs weighing from 55 to 70 pounds each, all from the same farm, are randomly divided into five groups (A–E) of six pigs each. Group A is sacrificed and, upon examination, each member is found to carry *S. choleraesuis* in its intestines and mesenteric lymph nodes.

Three of the remaining groups (B–D) are placed in equivalent housing and not subjected to extreme environmental stresses. One of these groups (B) serves as control and is fed a nutritionally-balanced ration containing no drug. Group C is fed, ad libitum, an identical ration to which 3-methyl-6(or 7)-fluoroquinoxaline-2-carboxamide-1,4-dioxide at 100 gms./ton has been added. After ten days of such treatment, group C is sacrificed and each member is found to be free of *S choleraesuis* in its intestines and mesenteric lymph nodes.

Group D, a control group which received unmedicated feed, and group E, which received the medicated feed, are subjected to stress conditions of temperatures of 85–95° C. throughout the test period (ten days). Group D developed characteristic symptoms such as weakness, recumbency, increased temperature and diarrhea within three to five days. Group E remained free of symptoms and, upon examination after sacrifice, is found to be essentially free of *S. choleraesuis* as is control group B.

Example III

The prophylactic efficacy of N-methyl-3-methyl-6(or 7) - fluoroquinoxaline - 2 - carboxamide - 1,4 - dioxide against an oral challenge of *S. choleraesuis* in swine is determined as follows:

Forty-eight healthy feeder pigs selected from a group of sixty are divided into four blocks of twelve pigs per block on the basis of weight. Pigs from each block are assigned into three treatment lots on the basis of body weight and sex.

Beginning on day one, all pigs are given a nutritionally-balanced feed and water ad libitum. One lot of each block (total of 16 pigs) serves as control and is given a non-medicated feed. The second lot of each block is given a medicated feed containing 50 g. of the drug per ton of feed, and the third lot of each block is given a medicated feed containing 100 g. of drug per ton of feed. The feed and water are given ad libitum.

On day three, all pigs are inoculated by gastrogavage with 20 ml. of an inoculum of *S. choleraesuis* having an estimated $2 \times 10^9$ cells per ml. Immediately following challenging, animals are allowed free access to their assigned rations. The experiment terminated on day eleven and all animals subjected to a gross necropsy examination.

All animals on the medicated feeds show marked improvement over the control animals, all of which developed characteristic symptoms of salmonellosis. Bacteriological cultures of the cecum of each pig at necropsy show the medicated pigs to have, in all instances, greatly reduced *S. chloeraesuis* populations. None of the treated animals developed scours as did all control animals.

The remaining compounds of Table I similarly demonstrate therapeutic efficacy.

Example IV

The therapeutic effectiveness of intramuscular injections of N,N-dimethyl-3-methylquinoxaline-2-carboxamide-1,4-dioxide and of N-methyl-3-methyl-6(or 7)-chloroquinoxaline-2-carboxamide-1,4-dioxide against an induced systemic salmonellosis in swine is determined in the following manner:

TABLE I.—AVERAGE WEIGHT STATISTICS

| Group Number:* | Initial body weight (kg.) | Conditioning period weight gain (kg.) | Final body weight (kg.)** |
|---|---|---|---|
| 1-L | 18.1 | 7.8 | |
| 1-H | 22.0 | 10.9 | |
| 2-L | 17.9 | 7.3 | 17.7 |
| 2-H | 22.2 | 11.0 | 20.9 |
| 3-L | 17.9 | 7.5 | 18.8 |
| 3-H | 22.0 | 11.0 | 20.9 |
| 4-L | 18.0 | 8.6 | 19.2 |
| 4-H | 22.2 | 11.2 | 21.6 |

*L=lightweight. H=heavyweight.
**6 pigs (3 in each group) died between days 4-6 of the trial.

TABLE II.—COMPARATIVE EFFECTS OF TREATMENTS UPON CLINICAL RESPONSE

| Treatment No.: | Average scouring Index [1] | | | Average scouring Incidence [2] | | | Average malaise Index [3] | | | Mortality | | |
|---|---|---|---|---|---|---|---|---|---|---|---|---|
| | L | H | Avg. | L | H | Avg. | L | H | Avg. | L | H | Avg. |
| 1 | 1.00 | 1.35 | 1.18 | 32.0 | 46.1 | 39.2 | 1.48 | 2.35 | 1.92 | 75 | 75 | 75 |
| 2 | 0.14 | 0.39 | 0.26 | 2.3 | 13.6 | 8.0 | 0.09 | 0.55 | 0.32 | 0 | 0 | 0 |
| 3 | 0.02 | 0.04 | 0.03 | 0.0 | 2.3 | 1.1 | 0.18 | 0.45 | 0.32 | 0 | 0 | 0 |
| 4 | 0.11 | 0.11 | 0.11 | 4.5 | 4.5 | 4.5 | 0.07 | 0.43 | 0.25 | 0 | 0 | 0 |
| 5 | 0.07 | 0.11 | 0.09 | 2.3 | 4.5 | 3.4 | 0.16 | 0.80 | 0.48 | 0 | 0 | 0 |

[1] Scouring index—0=normal; 1=soft; 2=moderately loose; 3=watery.

[2] Scouring incidence = $\frac{\text{Number pig days scouring (index} >1)}{\text{Number pig days}} \times 100$.

[3] Malaise index—0=active, normal; 1=slight depression; 2=apathetic, sluggish; 3=inactive, reluctant to move; 4=moribund, comatose.

Thirty-two young Yorkshire crossbred pigs (nine weeks) are divided into four groups of eight each. Each group is further divided into two groups of four pigs each—one lightweight and one heavyweight—to permit replication of the procedure. The animals are placed on a twenty-two day conditioning period prior to the experiment during which time they are offered a nutritionally-balanced adequate basal ration and water ad libitum.

Each pig is then challenged with 4 ml. of a culture of *S. choleraesuis* var. *kunzendorf* containing $75 \times 10^6$ organisms per ml. The challenge is intravenous via the jugular vein. All groups are fed an identical nutritionally-adequate ration.

Group 1 serves as control and receives no medication.

Group 2 receives two consecutive daily intramuscular doses of oxytetracycline at the rate of 5 mg./kg. of body weight (divided into 2.5 mg./kg. of body weight every twelve hours).

Group 3 receives N,N-dimethyl-3-methylquinoxaline-2-carboxamide-1,4-dioxide at a level of 5 mg./kg. of body weight intramuscularly for two consecutive days (divided into 2.5 mg./kg. of body weight every twelve hours).

Group 4 receives N-methyl-3-methyl-6(or 7)-chloroquinoxaline-2-carboxamide-1,4-dioxide at 5 mg./kg. of body weight on the same schedule as above.

The duration of the test is ten days. All pigs are necropsied at death or at termination of the experiment.

The non-medicated pigs become markedly anorectic and remained in this condition throughout the experiment. The quinoxaline-1,4-dioxide compounds were more effective in controlling diarrhea than was oxytetracycline as indicated in Table II. None of the treatments completely eliminated the *S. choleraesuis*. The two quinoxaline-1,4-dioxides are equivalent in efficacy to oxytetracycline.

What is claimed is:

1. A method for the control of *Salmonella choleraesuis* infections in domestic animals which comprises administering to said animals an effective amount of a compound of the formula:

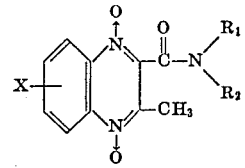

wherein

X is a 6- or a 7-position substituent selected from the group consisting of hydrogen, methyl, methoxy, chloro, bromo, fluoro and trifluoromethyl;

$R_1$ is selected from the group consisting of hydrogen and alkyl having from one to four carbon atoms; and $R_2$ is selected from the group consisting of hydrogen, methyl and ethyl;

with the proviso that the total number of carbon atoms in $R_1$ and $R_2$ is not greater than four.

2. The method of claim 1 wherein X is hydrogen.

3. The method of claim 1 wherein X is fluoro.

4. The method of claim 2 wherein each of $R_1$ and $R_2$ is hydrogen.

5. The method of claim 3 wherein each of $R_1$ and $R_2$ is hydrogen.

6. The method of claim 1 wherein the compound is administered to the animal at a level of from about 2.5 to about 50 mg./kg. of body weight.

References Cited

Miller et al.: J. Antibiotics, vol. 22, No. 7, pp. 293–296.

SAM ROSEN, Primary Examiner